(12) United States Patent
Ahlborn et al.

(10) Patent No.: US 10,834,373 B2
(45) Date of Patent: Nov. 10, 2020

(54) AUGMENTED WINDOWS

(71) Applicant: HYPERLOOP TRANSPORTATION TECHNOLOGIES, INC., Culver City, CA (US)

(72) Inventors: Dirk Ahlborn, Culver City, CA (US); Jan Heitger, Munich (DE); Diego Fernando Montoya Orozco, Munich (DE); Tiphaine Rousseau, Munich (DE); Dirk Schart, Munich (DE); Wolfgang Stelzle, Munich (DE)

(73) Assignee: Hyperloop Transportation Technologies, Inc., Culver City, CA (US)

( * ) Notice: Subject to any disclaimer, the term of this patent is extended or adjusted under 35 U.S.C. 154(b) by 0 days.

(21) Appl. No.: 15/456,213

(22) Filed: Mar. 10, 2017

(65) Prior Publication Data

US 2017/0280124 A1    Sep. 28, 2017

Related U.S. Application Data

(60) Provisional application No. 62/307,408, filed on Mar. 11, 2016.

(51) Int. Cl.
*H04N 13/117* (2018.01)
*H04N 13/366* (2018.01)
(Continued)

(52) U.S. Cl.
CPC ....... *H04N 13/117* (2018.05); *G06K 9/00342* (2013.01); *G06K 9/00671* (2013.01); *G06K 9/00832* (2013.01); *G06T 15/20* (2013.01); *G11B 27/11* (2013.01); *H04N 13/189* (2018.05); *H04N 13/366* (2018.05)

(58) Field of Classification Search
CPC ............ G06K 9/00342; G06K 9/00832; G06T 15/20; G11B 27/11; H04N 13/0014; H04N 13/0055; H04N 5/23238; H04N 5/23293; H04N 5/265; H04N 7/015; H04N 7/18; H04N 7/181; B64D 11/00;
(Continued)

(56) References Cited

U.S. PATENT DOCUMENTS

| 5,950,543 | A | 9/1999 | Oster |
| 2005/0001787 | A1* | 1/2005 | Montgomery ......... G09G 3/003 345/6 |

(Continued)

FOREIGN PATENT DOCUMENTS

WO    WO 98/31444    *   7/1998    ............ A63G 31/16

*Primary Examiner* — Gelek W Topgyal
(74) *Attorney, Agent, or Firm* — IP Authority, LLC; Ramraj Soundararajan

(57) ABSTRACT

The windowless prototypes of various evacuated tube transportation (ETT) based transportation systems, such as Hyperloop-based transportation systems, has the negative feel of an enclosed space. The lack of any kind of outside reference, the unknown sounds and the tremendous speed of the capsule/pod would surely cause anxiety with several passengers. A representation of the outside world shown within the pod/capsule using augmented windows alleviates this claustrophobic environment. At least for the closest passenger to the window, the illusion of looking out on a landscape is achieved using such augmented windows.

15 Claims, 12 Drawing Sheets

(51) Int. Cl.
  *H04N 13/189* (2018.01)
  *G06K 9/00* (2006.01)
  *G06T 15/20* (2011.01)
  *G11B 27/11* (2006.01)

(58) Field of Classification Search
  CPC ............ B64D 2011/0061; B64D 47/08; G06F 3/1431; G06F 3/1446; Y02T 50/46
  See application file for complete search history.

(56) References Cited

U.S. PATENT DOCUMENTS

| | | | | |
|---|---|---|---|---|
| 2005/0111100 A1* | 5/2005 | Mather | ................. | G02F 1/1323 359/464 |
| 2008/0312778 A1* | 12/2008 | Correa | .................... | H04L 67/12 701/3 |
| 2009/0168164 A1* | 7/2009 | Kean | ................. | G02B 27/2214 359/463 |
| 2010/0007766 A1* | 1/2010 | Ogawa | ............... | H04N 5/23232 348/229.1 |
| 2010/0157063 A1 | 6/2010 | Basso et al. | | |
| 2010/0188506 A1* | 7/2010 | Dwyer | .................... | H04N 7/18 348/144 |
| 2010/0253917 A1* | 10/2010 | Gao | ..................... | G02B 27/225 353/7 |
| 2010/0302347 A1* | 12/2010 | Shikata | ................. | H04N 5/232 348/36 |
| 2011/0096136 A1* | 4/2011 | Liu | ........................ | H04N 7/144 348/14.07 |
| 2012/0319870 A1* | 12/2012 | Riedel | ............... | B64D 11/0015 340/945 |
| 2013/0169807 A1* | 7/2013 | de Carvalho | .......... | H04N 7/183 348/144 |
| 2014/0160285 A1* | 6/2014 | Barrou | .............. | B64D 11/0015 348/144 |
| 2014/0375752 A1* | 12/2014 | Shoemake | ............. | G06F 3/011 348/14.07 |
| 2015/0363656 A1* | 12/2015 | Brauer | .................. | H04N 7/181 348/77 |
| 2016/0026253 A1 | 1/2016 | Bradski et al. | | |
| 2016/0057355 A1* | 2/2016 | Shimbo | ................. | H04N 5/247 348/239 |

* cited by examiner

AUGMENTED WINDOWS

RELATED APPLICATIONS

This application claims the benefit of U.S. Application Ser. No. 62/307,408 filed Mar. 11, 2016, the entire contents of which are incorporated herein by reference.

BACKGROUND OF THE INVENTION

Field of Invention

The present invention relates generally to the field of evacuated tube transportation (ETT) technologies. More specifically, the present invention is related to augmented windows provided within evacuated tube transportation systems, such as Hyperloop-based transportation systems.

Discussion of Related Art

Passengers of public and private transportation are used to being able to see out of their vehicle. Over-ground vehicles, such as buses or trains, but also underground trains and airplanes offer windows so that passengers have a reference for the movement that they experience in the vehicle Even though riders of public transportation do experience less stress than those of private vehicles, they do experience some level of stress. This stress might consist of psychological issues, such as being enclosed in a small space, proximity to strangers and others, as well as physiological issues, like insufficient leg space, nausea, inability to go to a bathroom.

Pods within evacuated tube transportation (ETT) systems, such as Hyperloop-based systems, do not have any windows so travelers do not have to be exposed to fast moving scenery. Such closed pods (and potentially closed tubes surrounding them) provide an unusual, claustrophobic experience for some passengers. This contrasts with subways, where windows are placed within subway cars to avoid a claustrophobic environment.

Introducing a public transportation vehicle that does not have windows might add to some of those stress-producing issues or even create new ones. For example, having no windows might cause the passenger to feel even more enclosed (psychological stress), having no visible reference for the experienced movement might lead to nausea (physiological stress).

Therefore, what is needed is a mechanism, which when installed in such ETT systems, avoids providing this potential claustrophobic environment. Embodiments of the present invention are an improvement over prior art systems and methods.

SUMMARY OF THE INVENTION

The present invention provides an augmented window system implemented in a capsule traversing an evacuated tube transportation (ETT) structure, the augmented window system comprising: (a) a display; (b) a tracking camera tracking location of a passenger within the capsule, the passenger located proximate to the display; (c) a computer: receiving a first location of the passenger within the capsule and rendering, on the display, a first perspective to the passenger corresponding to the first location; receiving a second location of the passenger within the capsule and rendering, on the display, a second perspective corresponding to the second location, the second perspective different than the first perspective; and wherein the first and second perspectives are derived from pre-recorded video data (or real-time 3D renderings). This process is repeated every time the user moves to a different location within the capsule and, as long as the user is proximate to the display, new perspectives are computed in real-time and displayed in the augmented window.

The present invention also provides a method as implemented in an augmented window implemented within a capsule traversing an evacuated tube transportation (ETT) structure, the method comprising: receiving, from a tracking camera located within the capsule, a first location of a passenger within the capsule and rendering, on a display within the capsule, a first perspective to the passenger corresponding to the first location, the passenger located proximate to the display; receiving, from the tracking camera located within the capsule, a second location of the passenger within the capsule and rendering, on the display, a second perspective corresponding to the second location, the second perspective different than the first perspective; and wherein the first and second perspectives are derived from pre-recorded video data (or real-time 3D renderings). This process is repeated every time the user moves to a different location within the capsule and, as long as the user is proximate to the display, new perspectives are computed in real-time and displayed in the augmented window.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
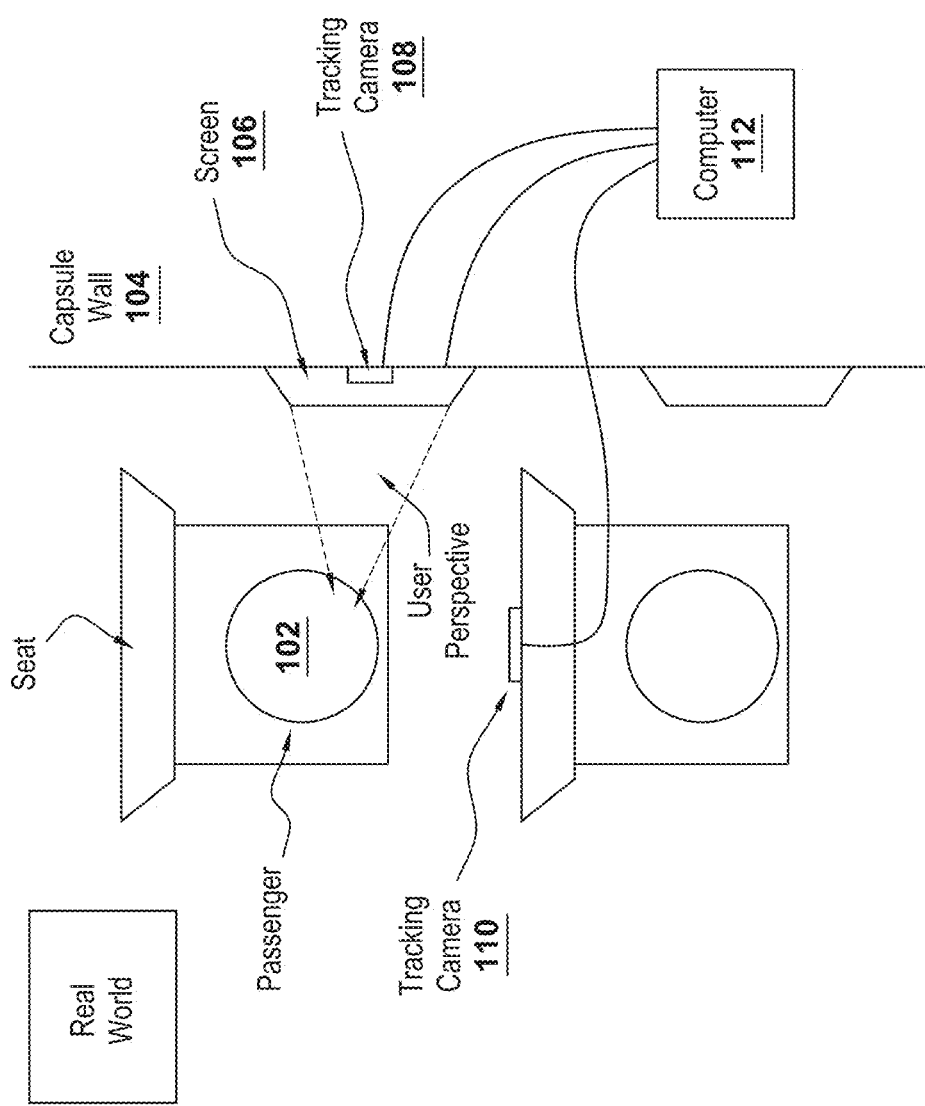
FIG. 1 illustrates a scenario where one or more tracking cameras are used to track the location of a passenger, where the location is used to render differing perspectives in an augmented window.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The present invention's pod does not have any windows, but is provided with one or more augmented windows, also called virtual windows, which overcomes the claustrophobic environment prevalent in prior art pod systems. The present invention creates a completely new passenger experience, where the passenger can see a real or simulated environment (i.e., simulated environment when staying in a station, leaving the station, and during the journey). In one embodiment, the perspective of the augmented window changes according to the position of the passenger within the pod, where such a change in perspective gives the passenger the impression of being near a real window. In addition to the augmented/virtual content, entertainment and information are other aspects which can also be displayed in the present invention's augmented window.

Passenger Experience

The right passenger experience depends on the passenger's activity and locations (within the pod), as well as on the current section of the travel. For example, three (3) pre-defined situations are considered:
 1) boarding (standing/walking),
 2) acceleration/deceleration (sitting), and
 3) cruising (sitting).

In one embodiment, for each of the situations described above, different content can be shown in order to reach a realistic effect and a good mix of entertainment and information. Three types of content that may be shown are:
 1) realistic scenery (simulated outside view),
 2) information, and
 3) entertainment.

In a non-limiting example, the following table (i.e., TABLE 1) shows for different phases, what type of content may be rendered (e.g., real scenery, entertainment content, information, etc.).

TABLE 1

| Type | Category | Phase | Details |
| --- | --- | --- | --- |
| Live Imagery | Real scenery | Boarding | Camera filming in the station while boarding |
| Recorded real imagery | Real scenery | Accel/Decel | Film of the real environment along the track without specific conditions like current weather |
| 3D content from movies | Entertainment | Cruising | 3D scenes for creating virtual environments |
| 3D Stereoscopic | Entertainment | Cruising | Stereoscopic content, 360 degree video |

TABLE 1-continued

| Type | Category | Phase | Details |
| --- | --- | --- | --- |
| 2D Movies | Entertainment | Cruising | Regular movies played on the various screens of the pod |
| Hyperloop Worlds | Entertainment | Cruising | Individual prepared content for turning the pod into a special world like an aquarium, in space (CGI) |
| Travel Info | Information | Cruising | Details about trip as on the airplane (Time, route, map, etc.) |
| News content | Information | Cruising | Personalized News channels like Flipboard ™ etc. |
| Own content | Information | Cruising | Connect your smartphone and use your data |
| Branded content | Entertainment | Cruising | Advertisements, Trailer, Branded worlds |
| Augmented Reality content | Information | Boarding; Accel/Decel; Cruising | Enhanced digital information superimposed to the real scenery |
| Window closing/opening | Phase change | General | Once boarding is completed windows close/become black for a moment |

In order to provide a unique experience while traveling within the ETT, different levels of augmented experiences may be provided. In one embodiment, when a passenger is "looking outside" through an augmented window, live or recorded imagery of the surrounding open environment may be shown. Another embodiment involves real-time simulated imagery, which has the advantage of allowing change to the perspective of the virtual window with low effort. A big challenge in such scenarios is to calculate the right perspective (of the passenger), which requires knowing what each passenger sees when they are looking out of their virtual window. The present invention uses tracking or another solution to know where the passenger's point of view is located.

Hardware
 Conventional screens may be used for implementing augmented windows.
 Taking large screens, but only using part of such a large screen for the real sceneries and show banner or other things to hide a part of the screen.

Tracking of Passenger's View
 1. Face tracking could be done with specific camera like from Wii remote with head-mounted sensor bar (two infrared LEDs) that requires the user to wear some device. This is not preferable since the user must wear a sensor.
 2. Face recognition/eye tracking/head tracking could be done using a conventional RGB camera.
 3. Passenger tracking could be done using an RGB-D (depth) camera, like those of Microsoft Kinect or Intel RealSense.
 4. The position of the passenger may be inferred based on the phase of the journey.

Pod Mock-Up and Planned Equipment
 Some non-limiting assumptions of the pod and the planned equipment are as follows:
 One screen may be used for each row.
 Screens may be fitted vertically (or in any other configuration) to the side panels of the pod/capsule.
 Moreover, various screen sizes may be used in conjunction with the present invention as part of the display.
 Camera may be fitted to backside of seat/inside panels.

Different interior arrangement of seat rows within a pod are envisioned for different classes (i.e., different arrangements for local, economy, or business)

The present invention's "Augmented Windows" can improve the experience of inhabitants of a windowless, enclosed space. Particularly, augmented windows may be used in ETT systems, such as Hyperloop-based transportation systems, where the present invention's augmented window simulates a window using a screen and software to depict a 3-dimensional landscape that appears as if it was behind the screen, like a real landscape appears behind a window.

As noted in the background, ETT systems, such as Hyperloop-based transportation systems, are unable to have windows since the pod/capsule moves inside a tube (which itself may not be transparent) and must withstand tremendous pressure (where having windows increases structural weakness). Augmented Window describes the technology that creates the illusion of looking through a window while looking at a screen. Without Augmented Windows, passengers on the train would have to face the stress noted in the background. The present invention's augmented windows offer passengers extended value (over regular windows) by being able to depict digital, real-time information with which the viewer can interact.

For simplicity, the initial description is provided if the tube in which the pod/capsule is travelling in an ETT system is transparent. In this example, the augmented window comprises a camera mounted to the back of a video screen, allowing the viewer of the video screen to see what happens behind the screen in real-time (based on data received from the camera, which is processed and sent to the video screen in real-time). This basic case, however, only works well if the user sits in a static position relative to the screen, never moving their head and the content of the video is far away from the camera. An issue arises when the viewer moves their head by more than a few inches, the illusion is broken and the screen's image appears as flat as it is (as the perspective of the viewer never changes).

Figure 5:
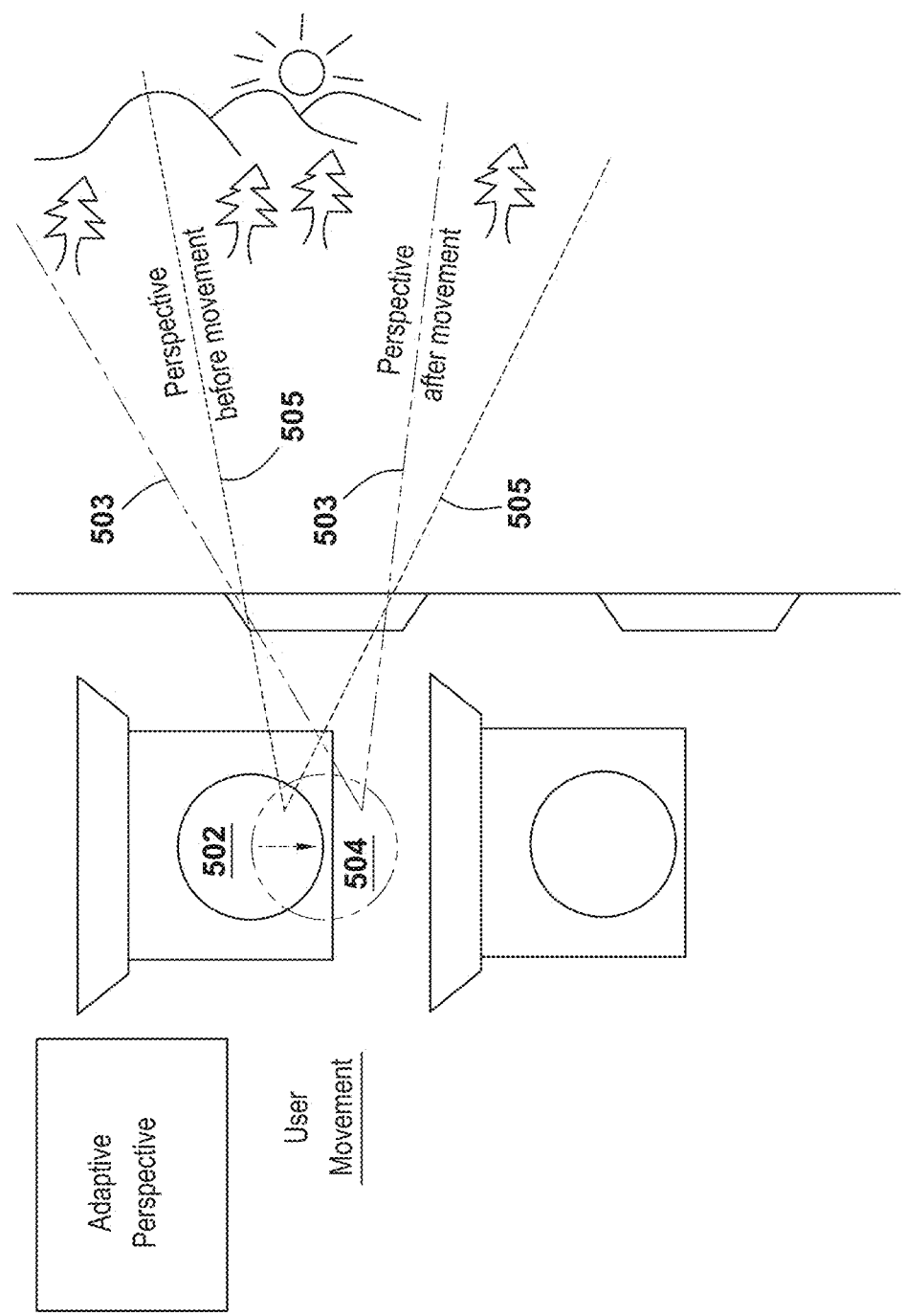
FIG. 5 and FIG. 7 illustrate how the setup tracks the passenger and calculates the view of the passenger as he/she moves in relation with the position of the window.

Head-, eye-, or face-tracking may be used to uphold the illusion of looking through a window by placing the recorded content (i.e., recorded behind the screen) so that the viewer always sees what they would when looking through the frame of an actual window. For example, when a person moves to the left, facing the window, they will see things that are to the right, outside of the window. Also, when a person moves from being further away from the window to being closer to the window, they will see more of what is outside of the window as the window takes up more space in their field of view. FIG. 5 depicts an example of such movement providing adaptive perspective, where the user moves from a position indicated by circle 502, having an associated perspective shown as 503, to position indicated by circle 504 having an associated perspective shown as 505.

Figure 6:
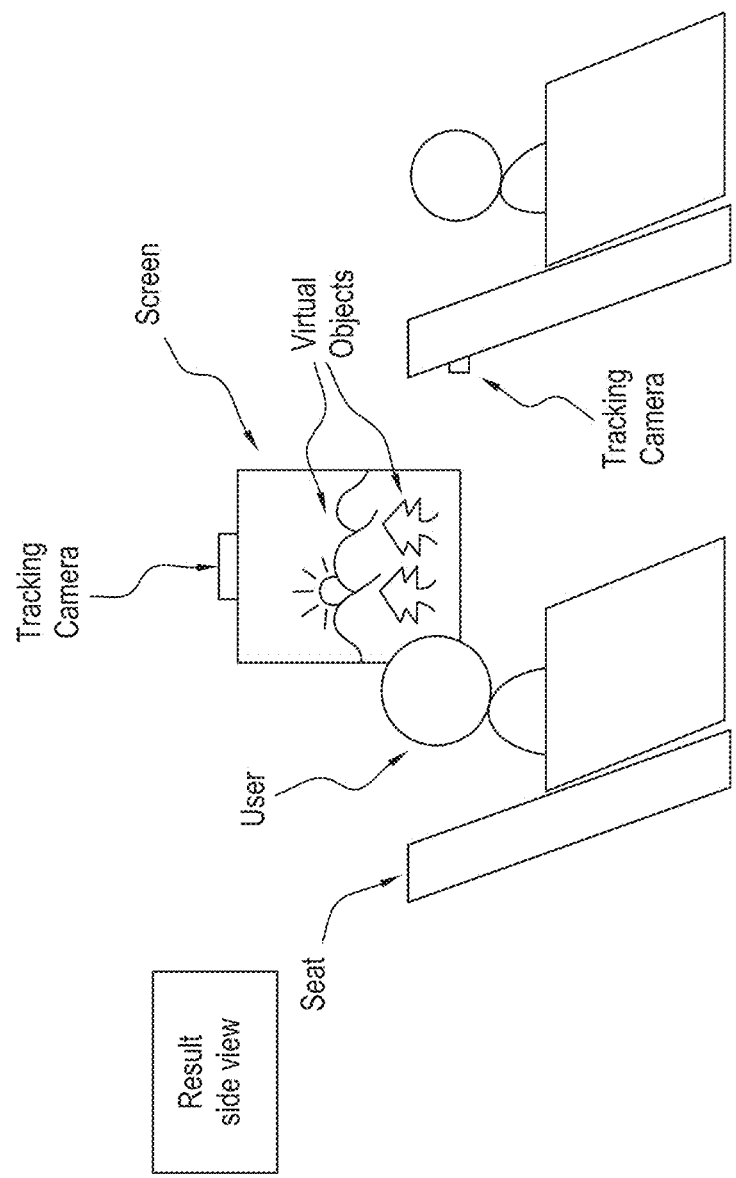
Figure 7:
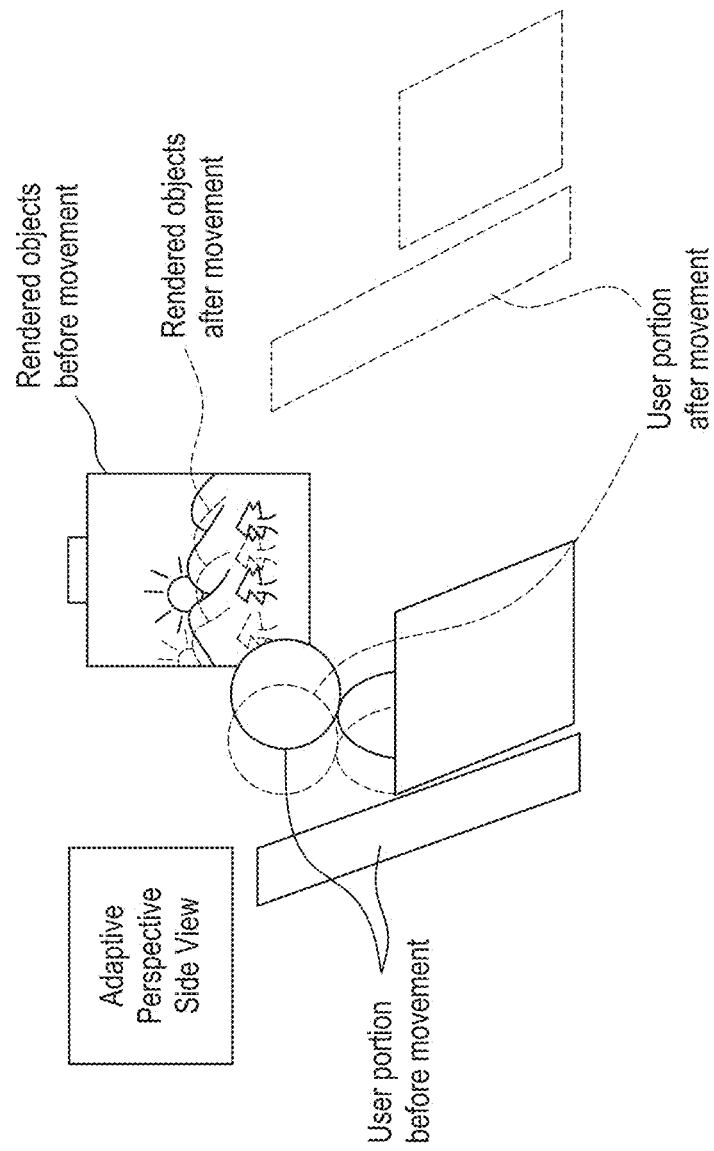

A side view of such adaptive perspective is shown in FIGS. 6-7, where FIG. 6 depicts the side view of the perspective as viewed by the user at the initial position (i.e., position 502 in FIG. 5), and FIG. 7 is the side-view of the perspective after the user has moved to a second position (i.e., position 504 in FIG. 5), where the change in position from the initial to the second position is tracked using the tracking camera. Moving and scaling a planar video source might be sufficient in some cases. In other cases, the landscape viewed through the screen is recreated in 3D space to give the best illusion.

Figure 2:
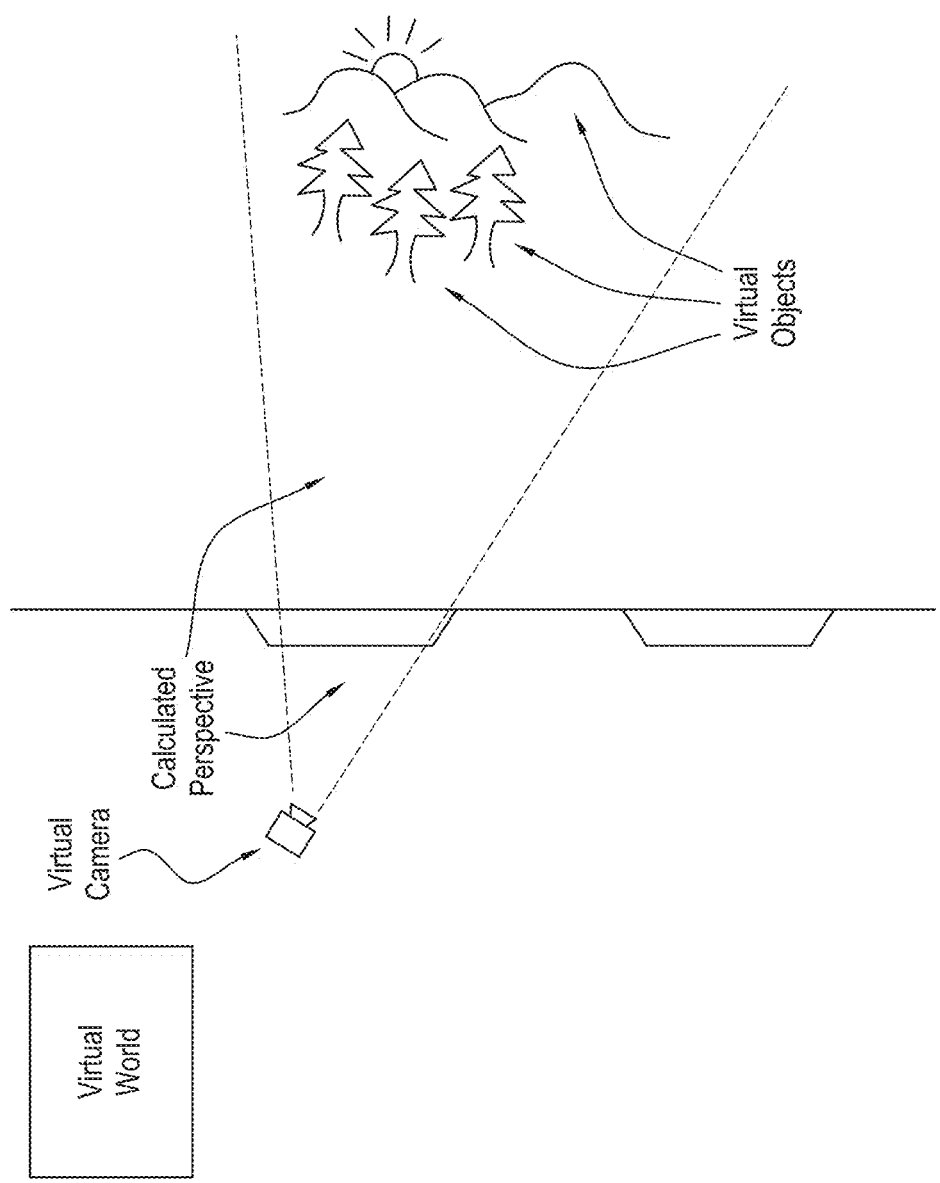
FIG. 2 illustrates how the virtual camera is set in an equivalent 3D pose (position and orientation) and frustum to that of the user in the virtual scene, from which the content is rendered.
Figure 3:
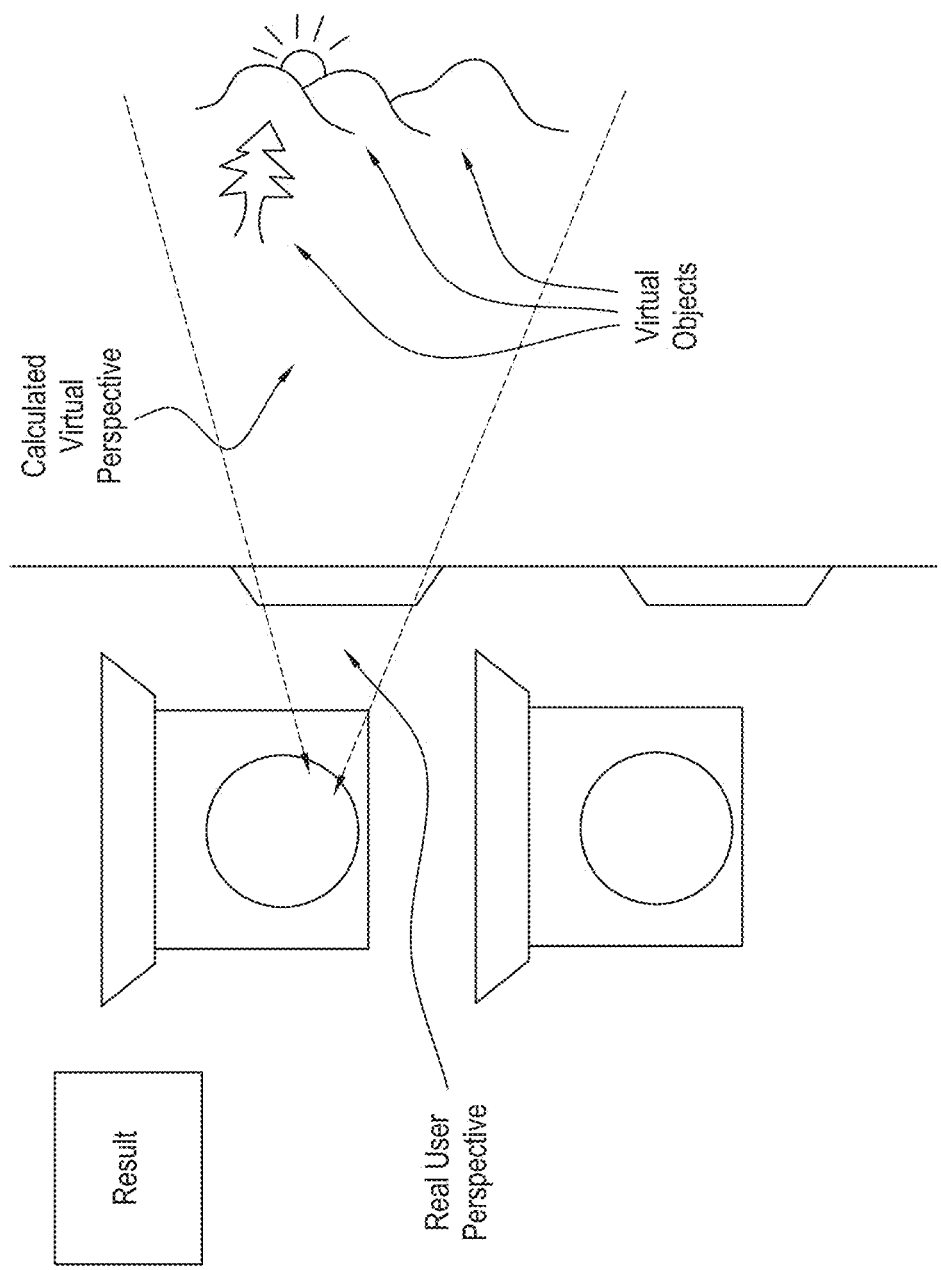
FIG. 3 and FIG. 6 illustrate a projection of the rendered scenery (virtual objects) with the correct perspective for the user.

The setup tracks the person and calculates the view of the person as he/she moves in relation with the position of the window (FIG. 5 and FIG. 7), and sets the camera in an equivalent 3D pose (position and orientation) and frustum to that of the user in the virtual scene, from which the content is rendered (FIG. 2). FIG. 2 shows the calculated perspective and the virtual terrain "behind" the augmented windows relative to the perspective as generated by the rendering camera. To achieve this, a virtual camera is placed in a position in the virtual world (where the position is equivalent to that of the person's view in the real world). The result is a projection of the rendered scenery (virtual objects) with the correct perspective for the user (FIG. 3 and FIG. 6).

The rendered scenery (virtual objects) might come from live or recorded footage, 3D rendered CGI, real-time rendered 2D or 3D, or a mix of all the mentioned possibilities.

Figure 4:
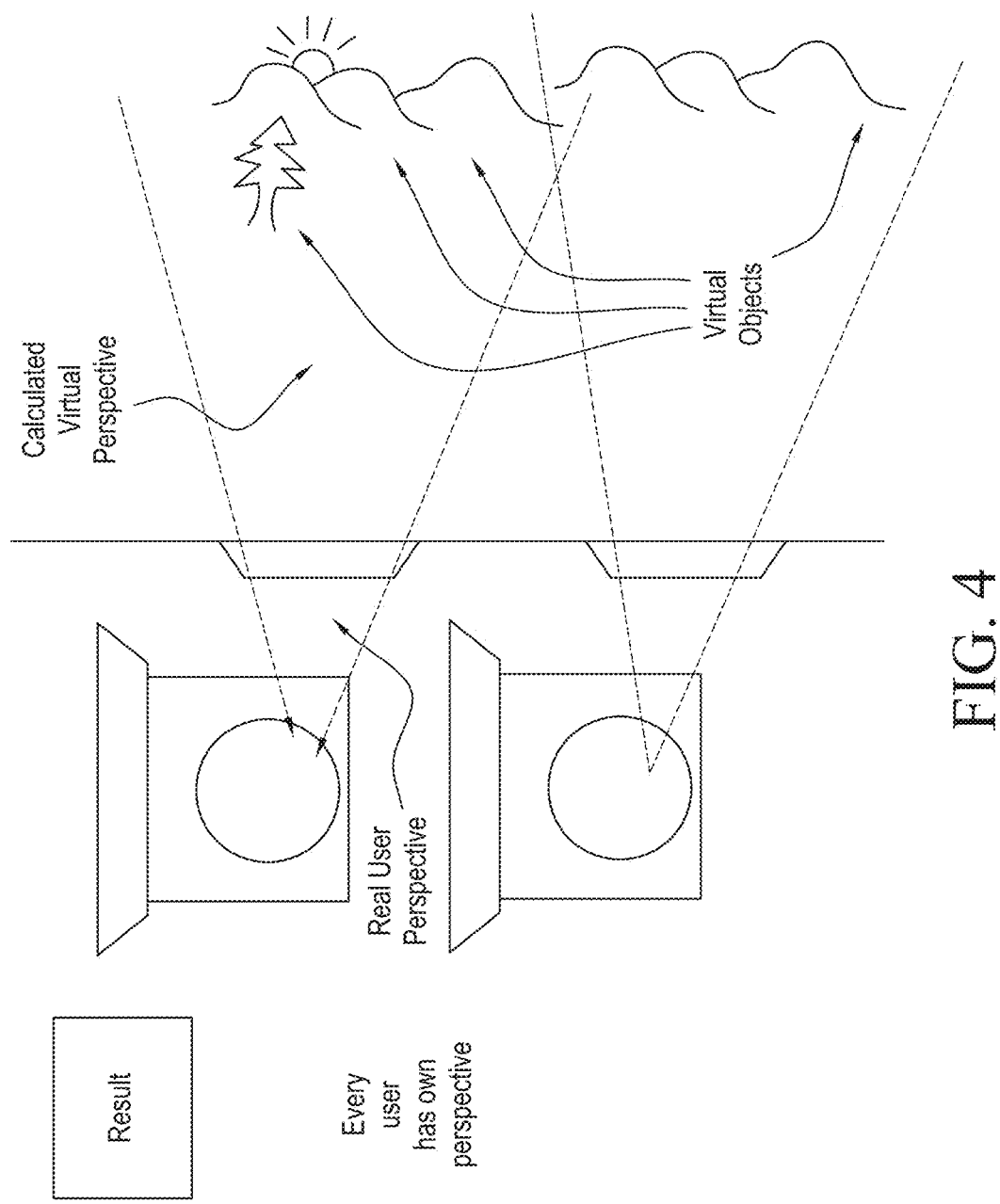
FIG. 4 illustrates how each user has their own perspective.

Perspective is calculated for each user separately (FIG. 4).

Furthermore, the present invention's augmented windows also give creators the ability to place additional content in the screen-space landscape that do not exist in reality where, in a non-limiting example, such additional content could include a pre-recorded video or interactive 3D content.

When interacting with virtual 3D content on a monitor, the human body poses certain requirements for the displayed content in order to avoid nausea. Some people are affected by this more than others. In general, people can fall victim to "motion sickness" when the virtual environment moves at a different rate or direction than they do. Passengers in moving vehicles can suffer from this when reading books (which do not move at all, compared to the vehicle) as well as watching movies or playing video games (which do move, but generally not in relation to the travel that the passenger is experiencing, the latter even motivated by the player's conscious input).

Applied to the present invention's augmented window case for ETT systems, such as Hyperloop-based transportation systems, there are two distinct vectors of motion that need to be depicted just right to avoid this motion sickness. Firstly, the rate at which the virtual content moves, simulating the ETT pod's/capsule's travelling speed. This does not need to be 100% accurate always. Only during the acceleration phase of the journey should the depiction of speed be somewhat accurate. However, once the acceleration phase is complete, the rate of speed cannot be accurately felt by the passenger, except while cornering (around a curve). However, such curves are minimally present in the general construct of Hyperloop-based transportation system.

Secondly, the rate of the eye tracking (or head tracking) needs to accurately reflect the viewer's movement. This needs to be significantly more accurate than the virtual content's traveling speed, since the eye tracking reflects the immediate relationship between the viewer and the "window". The "framerate" of the capture, the accuracy of the capture and the resulting calculation of the virtual content's scale and position are the essential factors for reducing nausea.

To have a landscape for the viewer to see when looking "through" the Augmented window, it will have to be recorded first. Depending on the physical size of the window and the proximity of the viewer to the window, the resolution of the camera image must be chosen. Generally, the closer the viewer is to the window, the more fidelity the camera must provide. Similarly, the larger the window is, the higher the camera's resolution must be. If the viewer has access to a large viewing angle of the screen, the image will even have to be composed of several camera images.

To produce an image having an accurate feel, the recording device should be mounted closely to the rear side of the augmented window, to create the illusion of looking through a screen. In an array of several windows, each one would need a separate camera for a realistic experience. In some cases, a creator of an augmented window would use not only one camera but a "camera rig" on an augmented window to create a wrap-around landscape for the viewer to explore.

Because the creator of the Augmented Window cannot anticipate, which parts of the image the viewer will focus on, the camera should be set up to have very little or no depth of field. This is a feature that many modern cameras of small form factor have anyway.

The application of such augmented windows for ETT-based transportation systems, such as Hyperloop-based transportation systems, is a special case. In the preferred embodiment for such ETT-based transportation systems, the images displayed in the Hyperloop's Augmented Windows is not a live stream, but is based on previously recorded data. Since the vehicle travels inside a tube, cameras cannot be mounted on the outside of the vehicle because they would be recording the inside of the tube's wall. An alternate embodiment is envisioned where cameras are mounted outside of the tube, where such cameras either should have their own high-speed locomotion system (that matches the speed of the capsule/pod) or such cameras are arranged in a dense array spanning the entire length of the track. Such alternative embodiments are on the expensive side. In the above-noted preferred embodiment, the solution involves recording the entire track in high fidelity stereoscopic 3D once for each side (i.e., once from the origin to the destination, and another time when traveling from the destination to the origin), on the outside of the tube to be played back later.

Stereoscopic 3D refers to two cameras (or camera rigs) used to record the image, where there is one rig for each eye. To create a realistic 3D experience, each pair of cameras needs to be apart the same distance the average human eyes are apart. This distance is called the Inter-Pupillary-Distance or IPD.

As an analog to the fidelity of the recorded image, the screen, which the landscape is projected on, should have a high enough resolution for the viewer to appreciate it. If the user moves right up to the screen of the augmented window, its pixel density needs to hold up to scrutiny and be appropriately high. Many displays have a narrow optimal viewing angle, usually head on. If viewers are likely to be in a position out of this angle, they will not have an optimal experience and a monitor with different characteristics is needed. In contrast, if the window is designed to be relatively small (like in an airplane) or access is constricted (e.g. by a narrow hallway), a less sophisticated display may be sufficient.

There are different ways to display stereoscopic images on modern screens, although most of them involve the use of special glasses for them to work. A subsection of today's 3D-enabled screens makes use of auto-stereoscopy, a selection of technologies that allow seeing 3D images without wearing glasses. In short, these displays use an array of microscopic lenses or shutters to channel the light of individual columns of pixels into the right or left eye, depending on the viewing angle. Most of these displays, however, work only in a very constricted field of view.

A way to improve the augmented window experience, particularly with regards to ETT systems, such as Hyperloop-based transportations systems, is to adapt the depicted landscape to the viewer's position. To do this, a camera, pointing at the viewer, is required. FIG. 1 depicts an example scenario where a passenger 102 seated within a capsule/pod (having a capsule wall 104) with a computer 112 (it should be noted that this computer is located within the capsule, and is only shown outside of the capsule for convenience) that provides, in the preferred embodiment, pre-recorded data to be shown in a screen 106. A tracking camera 110 is pointed at the passenger 102, whose perception is based on what he views on the screen 106. It should be noted that there could be more than one tracking camera per passenger. For example, in addition to the tracking camera 110 that is in front of the passenger's seat, there could be an additional tracking camera 108 that may be either part of, or attached to, the screen 106. Based on data from such tracking cameras 108 and 110, the computer can vary the perspective of the user shown on screen 106 to give a more realistic feel of peering into a window. This camera generally does not have to be of high quality, as its image is never shown to the viewer. The software using the camera often operates at a relatively low resolution and generally does not even need color information. However, it does need to be strong enough to detect people from all positions that the augmented window can be seen from.

Figure 10:
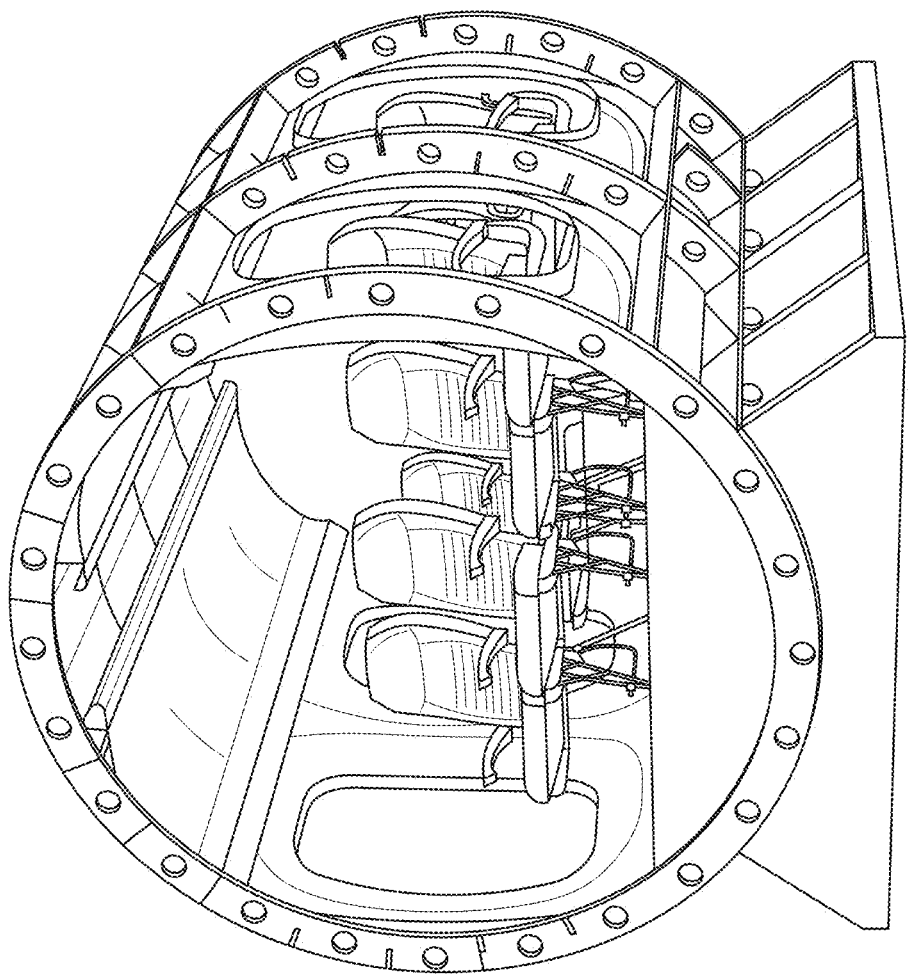
FIGS. 10-11 depict a non-limiting example of the framework of the capsule showing one seating arrangement within the capsule.
Figure 11:
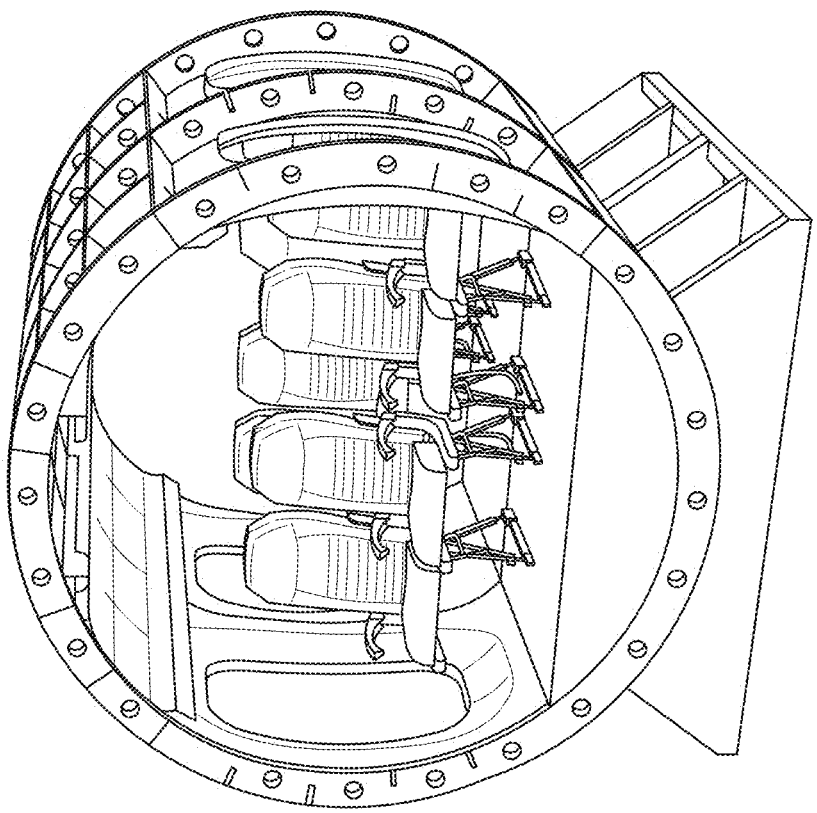
Figure 11:
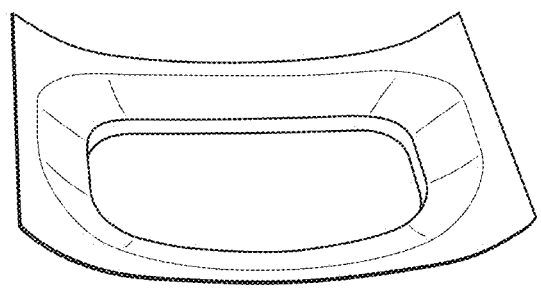
Figure 12:
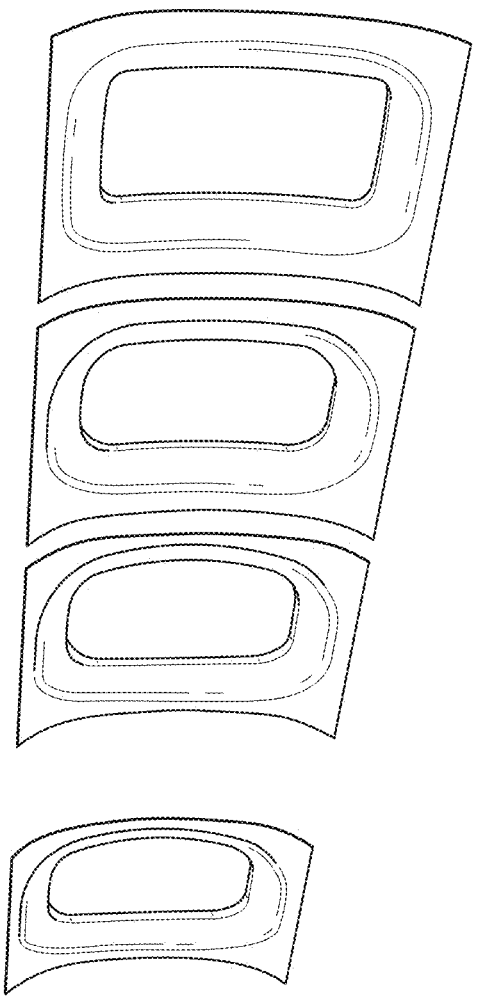
FIG. 12 depicts the frame that holds the display.

FIGS. 10-11 depict a non-limiting example of the framework of the capsule showing one seating arrangement within the capsule. FIG. 12 depicts a non-limiting example of a frame that holds the display in the capsule.

Displaying a high-resolution real-time video stream does require a moderate amount of processing power. For a singular, static augmented window this power should be manageable and inexpensive. Commercially available streaming hardware might be employed here. If the setup is meant to be more dynamic and adapt to the viewer's position, more computation power is required (e.g., to determine the viewer's head- or eye-position and triangulate the needed position of the viewed content, or to position the virtual landscape, in some cases in a 3D real-time renderer). Out-of-the-box hardware is rarely suitable for this task. The components should be manually configured and calibrated.

No matter how elaborate the simulation of the landscape, there needs to be software that translates the entirety of the recorded landscape to the actual pixels of the display employed. Depending on the detail level of the simulation, the software used can range from readily available streaming-specific to specialized custom software.

On the low-end spectrum for an installation without eye or head tracking, the camera image merely needs to be streamed to the screen. There might not even be any software (other than that used by the recording device and the screen) necessary at all for this kind of setup. Once additional content is displayed on the screen, it should be added using a compositing program.

Any Augmented Window that tracks the eyes of the viewer creates a virtual image that is bigger than the actual pixel count of the monitor. Since the portion of the image that the viewer sees increases in scale, the further the viewer moves away from the screen, the resolution of the virtual landscape needs to be quite large. To guarantee an optimal view from any angle, the virtual landscape needs to exist as a hemi-sphere. To maintain this deformation as the viewer moves around the window, real-time 3D software needs to be employed.

Because such a high resolution is required and such a high field of view must be maintained, the image of one camera is often not enough to support the Augmented Window (although, this is rapidly changing with the availability of single cameras that can record 180° or 360° content right out-of-the-box). The virtual landscape on the "other side" of the window will be composed of the images of several cameras. This requires software capable of "stitching", compositing several images into one, large, and in this case, distorted, image.

Once the image is created, it will have to be cropped, scaled and flattened to be displayed on the pixels of the display. Most of the types of software described above already have a built-in solution for displaying (rendering) the needed image to the connected screen. Commercially available 3D engines usually offer a way to export executables that work on a wide range of hardware. Depending on the hardware used, the software should reduce the fidelity of the virtual landscape in order to achieve a performance matching ergonomic requirements, i.e. achieving a comfortable framerate.

The "framerate" means, how many times in one second the virtual position of the viewer is updated. There can be many different framerates in one application. The rate at which the screen flashes its pixels (usually 60 Hz or 60 frames per second), the rate at which the virtual landscape is moved and the rate at which the position of the viewer's eyes is determined. Ideally, all of these are the same. Realistically, the latter function has the lowest framerate, as the interpretation of the inside camera's image finding the viewer's eye position cannot be done 60 times a second by most available software or hardware solutions.

As described above, the requirements for a face or eye tracking algorithm are very specific. It needs to provide the position of the face in 3D space. However, (at the current state, for one viewer) it docs not have to provide information on the viewer's face's rotation or gaze direction. It also docs not need additional information e.g. the viewer's sex or age. The updates on this information need to be very rapid (for example, at a rate of 60 Hz). However, potential exists for both the display and the tracking hardware to work at higher rates (as such rates are dictated by processing power, camera type, etc.).

Instead of displaying the outside landscape realistically, information or recreational content could be displayed, placed in the virtual landscape.

The displays used in the train could feature touchscreens, making the content displayed on them interactive. This, however, would not work well with stereoscopic screens. Focusing the eyes on their own finger, the viewer would break their 3D experience.

In one embodiment, the screens could be used to display advertisement. They could show banners at the edges of the screen but also augment the virtual landscape with three-dimensional content such as billboards but also animated, volumetric content like attacking creatures for an upcoming monster movie.

Advertisement—the Walking Dead: Bus Stop Installation

The setup is a rather simple one: One of the inside panels of a Vienna bus stop, usually reserved for advertisement posters, is replaced with a screen of the same format. Displayed on the screen is the camera image of the other side of the screen. The camera is placed in a way to simulate looking through a sheet of glass to somebody sitting inside the bus stop.

Once a person sits down on the bench, characters from the show "The Walking Dead" appear in the "window" and start to scare the viewer by attacking actors composited into the virtual landscape or pounding on the Augmented Window. To resolve the situation, eventually the title of the show and other textual information appears.

This is effective because it appears as if gruesome violence is happening in the real environment and the actors appear to be interacting with the viewer. On the other hand, the experience is quite limited, because it only works, if the viewer sits very still in one spot (the bench). This one-time installation was extensively filmed and very gated because, obviously, the subject matter of the advertisement was very unsuitable for the public. The footage recorded of the installation was itself used as an advertisement; both for the show, and for the creators of the event. Such advertising implementations are envisioned as part of the ETT transportation augmented window.

Static installations, like "The Walking Dead", and even more so tracked applications have the problem that they only appear realistic for one person. People who necessarily have to watch the display from other angles do not get the same effect or even physically stressful effects from their experience of the same installation. This has, until now, limited the possibilities of multi-target Augmented Windows.

As noted earlier, in the embodiment where the passengers are provided with a real-time image provided using outside camera(s), such camera(s) would either have to travel at the same speed as the Hyperloop, or cameras would have to be mounted along the entire length of the track. Maintaining such an array would cost a significant amount of time and resources.

Alternatively, as per the preferred embodiment, it would be more practical to record the track once, allowing for a single set of equipment and a safe speed for that equipment. The camera rig used for this recording would have to be sophisticated enough to record the entire virtual environment for one side of the Hyperloop car. It would not record both sides at once, because one side of the 360° image would always see the Hyperloop's tube, which would realistically never be seen from the tube itself. This means recording a hemisphere worth of landscape, once for each eye to create a stereoscopic effect. Unfortunately, this endeavor would not be as easy as mounting cameras on top of a pole that extends from the roof of a car. The camera array used for this would have to be motion controlled and balanced to always be at the same height (as compared to sea level). A constant speed of the vehicle during the recording cannot be guaranteed, which is why the speed of the filming vehicle would have to be recorded in order to ensure a constant speed on playback of the video footage.

This entire recording would have to be done once for daytime travel and once for nighttime travel. Furthermore, it would have to be recorded once for each weather condition and once for each season, multiplied by two for day and nighttime. Some of these conditions could be simulated, however.

Since the entire train ride would be one video file (or rather, one for each side) the task of the rendering software would not be to stitch together a set of camera images in real-time but rather to play back the video at the right speed. Of course, the Hyperloop would not be going the exact same speed at the exact same point each journey, the video's playback speed would have to be coupled with the car's actual rate of speed in real-time. Because of this and the sheer amount of data throughput a high-resolution stereoscopic hemisphere would require, standard video players could not handle this task. On top of that, the hemisphere, or rather the passe-partout that the viewer will see, will still have to be moved while the viewer's eyes are being tracked. The entire display mapping would have to be done by a specialized, custom software. Infrastructure capable of this is already employed today.

As drones, especially flying ones, are becoming more popular and prolific, the recording process might become more automated or could be performed more often than using a vehicle travelling on the ground. The cameras used for recording would not have to be mounted in one, heavy rig but might do their recording individually, with the image being composed later.

The second iteration of the Nintendo 3DS handheld console already offers an adaptive, autostereoscopic screen. At the experimental stage are different technologies that can control the light of each pixel for each angle, enabling them to display different images for different angles of the screen. The result would be that one person could see a different image for each eye on the same screen, without using glasses.

As each pixel can change color several times over the course of its nearly 180° rotation, it would also be feasible to not only project to the two eyes of one viewer, but also all of the other viewer's eyes, enabling all of them to see their own version of the image in 3D. However, as viewers might be very close to each other, there could be overlap, due to the pixels only rotating in the horizontal direction.

Users could wear devices, like e.g. 3D glasses, to not only allow them to see in stereo, but also assist the tracking.

Figure 8:
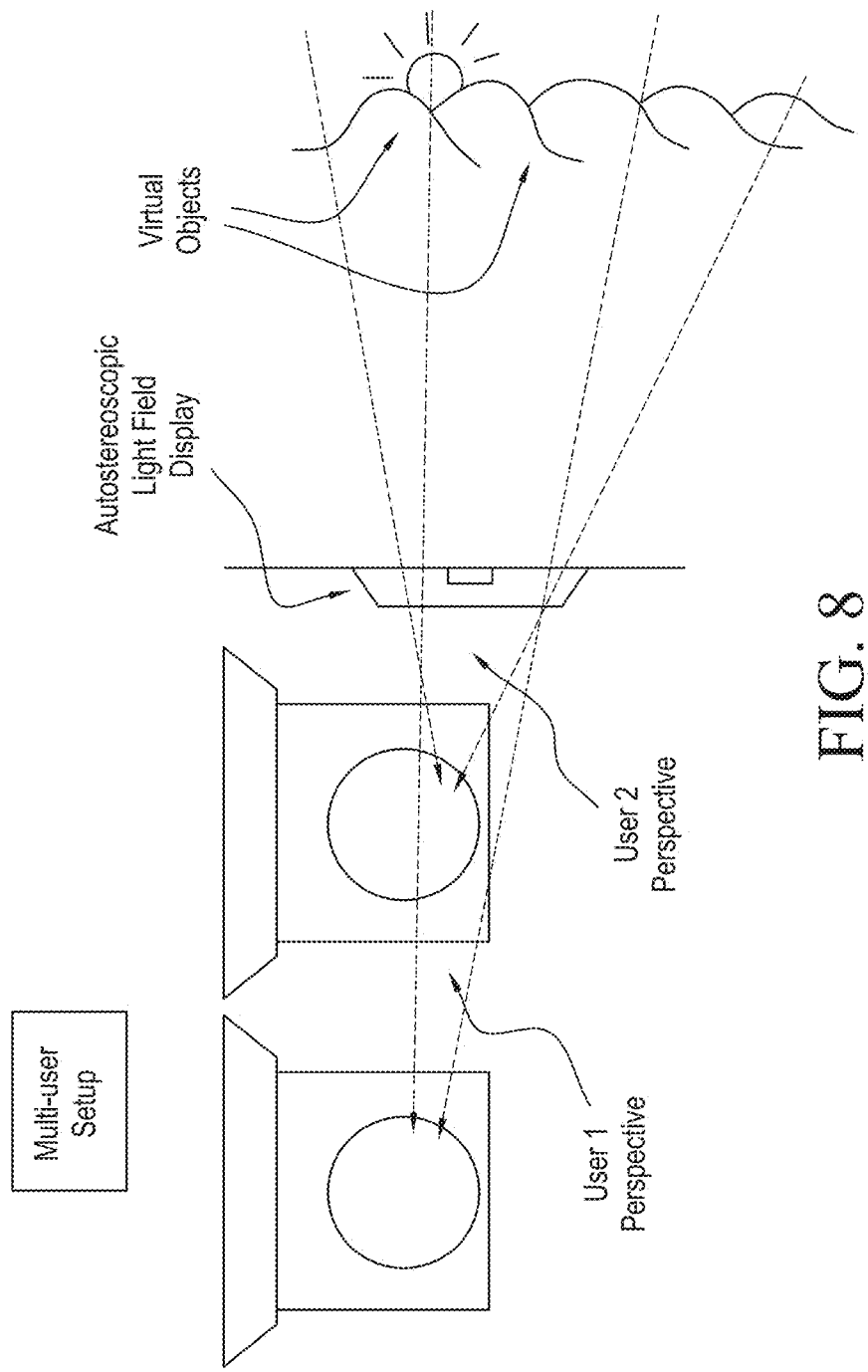
FIG. 8 illustrates a setup with multiple users sharing a display, with each user having their own perspective rendered on the same augmented window.

FIG. 8 illustrates a setup with multiple users sharing a display, with each user having their own perspective rendered on the same augmented window. Auto stereoscopic and light field displays allow not only the user to see the content in stereo, but could allow multiple users to have independent perspective correct views.

Figure 9:
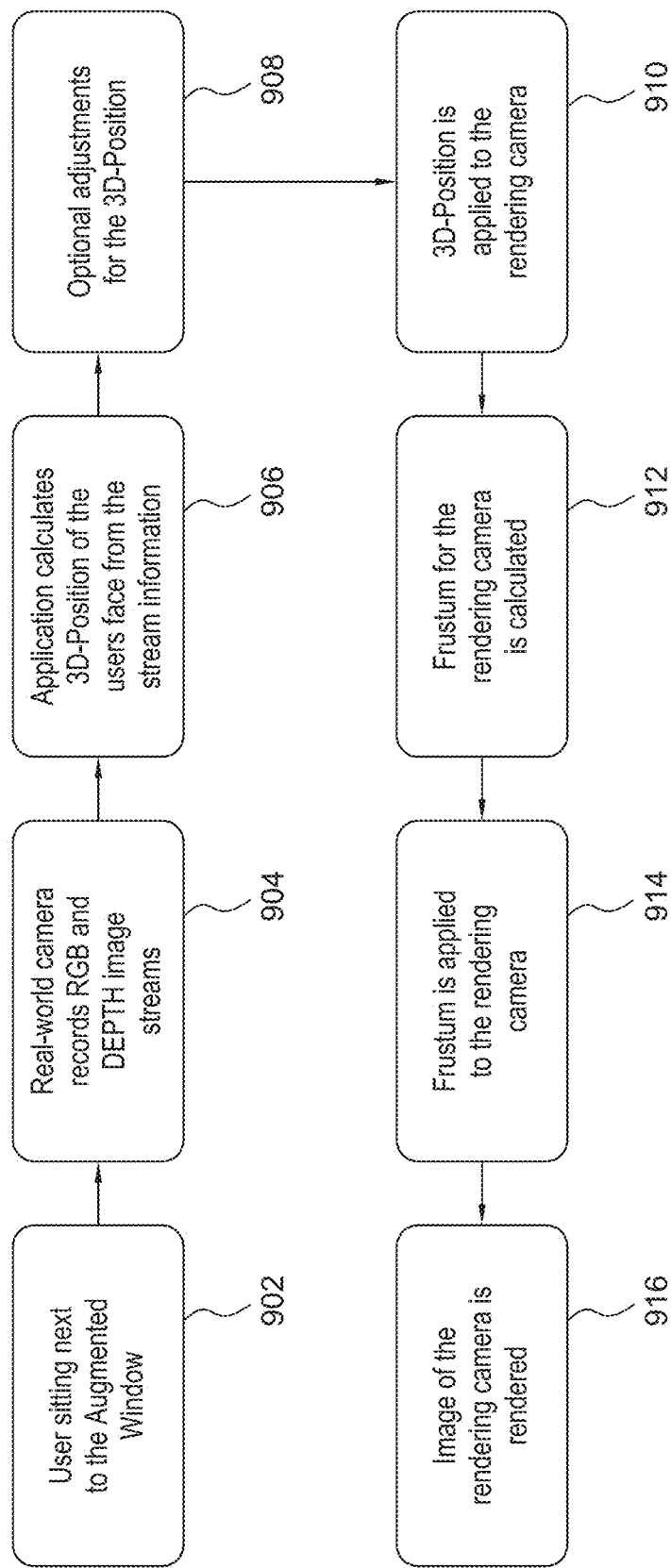
FIG. 9 depicts an example flow chart of how perspectives are rendered based on the teachings of the present invention.

FIG. 9 depicts an example flow chart of how perspectives are rendered based on the teachings of the present invention. While the passenger is sitting next to the augmented windows (step 902), he/she is recorded by a camera that provides the augmented window application with an RGB-stream and a depth-stream (step 904). From this information, the augmented window application running in a computer within the capsule reads a 3D-position of the passenger's face (step 906) (optional adjustments are also possible for 3D positions (step 908)). To derive the perspective of the passenger, looking through the window, his 3D-position gets applied to the rendering camera of the augmented window application (step 910). With the position of the rendering camera and the corners of a given reference window (the virtual representation of the real window, the passenger would look through), a frustum is calculated (step 912) and applied afterwards to the rendering camera itself (step 914). With the new frustum, the image of the camera, showing the new perspective, is rendered to the display (step 916). As the user moves, the position of the rendering camera and the calculation of the frustum gets updated, to always render in the right perspective.

Motion sickness is a well-known phenomenon, especially in the VR field, where low frame rates or wrong tracking cause sickness. In general, in closed vehicles, motion sickness is common, caused by how the senses perceive movement. Augmented Windows alleviate claustrophobia by making the capsule look open. Augmented Windows alleviate motion sickness by showing proportional acceleration, deceleration and speed in the rendered scenery, and so diminishing the discrepancy between sight and the vestibular system. The key word is proportional acceleration, deceleration and speed shown in the augmented windows don't necessarily have to be identical, but must at least be proportional.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to controllers or processors that may execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of augmented windows. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific hardware.

The invention claimed is:

1. A system comprising:
a capsule traversing an evacuated tube transportation (ETT) structure, the capsule having at least one augmented window system;
the augmented window system comprising:
a display;
a tracking camera tracking at least a head position of a passenger within the capsule, the passenger located proximate to the display, the tracking camera tracks location using any of the following: face tracking or eye tracking;
a computer:
receiving a first location of the passenger within the capsule and providing via a three-dimensional rendering, on the display, a first perspective to the passenger corresponding to the first location;
receiving a second location of the passenger within the capsule and providing via another three-dimensional rendering, on the display, a second perspective corresponding to the second location, the second perspective different than the first perspective;
wherein the first and second perspectives are derived from pre-recorded video data, the first and second perspectives representing different perspectives of a same scene, and the first and second perspectives are each calculated based on a virtual camera placed in an equivalent 3D pose and frustum to that of the passenger, and the second perspective showing less of the same scene compared to the first perspective in one direction and the second perspective showing more of the same scene compared to the first perspective in another direction,
wherein, based on the tracking camera, additional perspectives are continuously computed each time the passenger moves to a different location within the capsule,
wherein, when the passenger is proximate to the display, such additional perspectives are derived from pre-recorded video data in real-time and displayed in the display, and
wherein video playback in the display is a function of a speed of the capsule.

2. The system of claim 1, wherein the tracking camera additionally tracks orientation of the passenger.

3. The system as per claim 1, wherein the pre-recorded video data comprises pre-recorded stereoscopic 3D data.

4. The system as per claim 3, wherein the first perspective and second perspective are computed using a 3D real-time renderer.

5. The system as per claim 1, wherein the tracking camera is in front of the passenger.

6. The system as per claim 1, wherein the tracking camera is part of the display.

7. The system as per claim 1, wherein the rendered first and second perspectives additionally include an advertisement.

8. A method as implemented in an augmented window implemented within a capsule traversing an evacuated tube transportation (ETT) structure, the method comprising:
receiving, from a tracking camera located with the capsule, a first location of a passenger within the capsule and providing via a three-dimensional rendering, on a display within the capsule, a first perspective to the passenger corresponding to the first location, the passenger located proximate to the display, the tracking camera locating the passenger by tracking at least a head position associated with the passenger, the tracking camera tracks location using any of the following: face tracking or eye tracking;
receiving, from the tracking camera located with the capsule, a second location of the passenger within the capsule and providing via a three-dimensional rendering, on the display, a second perspective corresponding to the second location, the second perspective different than the first perspective;
wherein the first and second perspectives are derived from pre-recorded video data, the first and second perspectives representing different perspectives of a same scene, and the first and second perspectives are each calculated based on a virtual camera placed in an equivalent 3D pose and frustum to that of the passenger, and the second perspective showing less of the same scene compared to the first perspective in one direction and the second perspective showing more of the same scene compared to the first perspective in another direction,
wherein, based on the tracking camera, additional perspectives are continuously computed each time the passenger moves to a different location within the capsule,
wherein, when the passenger is proximate to the display, such additional perspectives are derived from pre-recorded video data in real-time and displayed in the display, and
wherein video playback in the display is a function of a speed of the capsule.

9. The method as per claim 8, wherein the tracking camera additionally locates the passenger by tracking the passenger's orientation.

10. The method as per claim 8, wherein the pre-recorded video data comprises pre-recorded stereoscopic 3D data.

11. The method as per claim 10, wherein the first perspective and second perspective are computed using a 3D real-time renderer.

12. The method as per claim 8, wherein the tracking camera is in front of the passenger.

13. The method as per claim 8, wherein the tracking camera is part of the display.

14. The method as per claim 8, wherein video playback in the display is coupled to a speed of the capsule.

15. A system comprising:
(a) a capsule traversing an evacuated tube transportation (ETT) structure, the capsule having at least one augmented window system;
(b) the augmented window system comprising:
  (b1) a display;
  (b2) one or more tracking cameras tracking locations of a first passenger and a second passenger seated within a same row in the capsule, the first passenger and the second passenger located proximate to the augmented window and having a view of the augmented window, wherein the one or more tracking cameras locates the first or second passenger by tracking each passenger's head position and orientation, the tracking camera tracks location using any of the following: face tracking or eye tracking; and
  (b3) a computer:
    receiving a first location of the first passenger proximate to the augmented window;
    providing, via a three-dimensional rendering, on the augmented window, a first perspective to the first passenger corresponding to the first location;
    receiving a second location of the second passenger that is seated in the same row as the first passenger, the second passenger also proximate to the augmented window;
    providing, via another three-dimensional rendering, on the augmented window, a second perspective to the second passenger corresponding to the second location;
    wherein the first and second perspectives are derived from pre-recorded video data, the first and second perspectives representing different perspectives of a same scene, and the first and second perspectives are each calculated based on a virtual camera placed in an equivalent 3D pose and frustum to that of the passenger, and the first and second perspectives rendered on the augmented window in (a), and the second perspective showing less of the same scene compared to the first perspective in one direction and the second perspective showing more of the same scene compared to the first perspective in another direction,
    wherein, based on the tracking camera, additional perspectives are continuously computed each time either the first or second passenger moves to a different location within the capsule,
    wherein, when either the first or second passenger is proximate to the display, such additional perspectives are derived from pre-recorded video data in real-time and displayed in the display, and
    wherein video playback in the display is a function of a speed of the capsule.

* * * * *